(12) United States Patent
Mironets

(10) Patent No.: US 9,950,467 B2
(45) Date of Patent: Apr. 24, 2018

(54) METHOD FOR PRODUCING VOID-FREE ADDITIVELY MANUFACTURED COMPONENTS

(71) Applicant: United Technologies Corporation, Hartford (CN)

(72) Inventor: Sergey Mironets, Charlotte, NC (US)

(73) Assignee: United Technologies Corporation, Farmington, CT (US)

(*) Notice: Subject to any disclaimer, the term of this patent is extended or adjusted under 35 U.S.C. 154(b) by 245 days.

(21) Appl. No.: 14/695,200

(22) Filed: Apr. 24, 2015

(65) Prior Publication Data
US 2015/0321417 A1 Nov. 12, 2015

Related U.S. Application Data

(60) Provisional application No. 61/990,345, filed on May 8, 2014.

(51) Int. Cl.
B29C 65/02 (2006.01)
B29C 67/00 (2017.01)
B33Y 30/00 (2015.01)
B33Y 80/00 (2015.01)
B29C 64/141 (2017.01)
B33Y 10/00 (2015.01)
B22F 3/105 (2006.01)

(52) U.S. Cl.
CPC ............ *B29C 65/02* (2013.01); *B29C 64/141* (2017.08); *B22F 2003/1051* (2013.01); *B33Y 10/00* (2014.12); *B33Y 30/00* (2014.12); *B33Y 80/00* (2014.12); *Y10T 156/1074* (2015.01); *Y10T 156/12* (2015.01)

(58) Field of Classification Search
CPC ..... B29C 65/02; B29C 67/0074; B32B 15/00; B33Y 10/00; B33Y 80/00; B33Y 30/00; Y10T 156/1074
See application file for complete search history.

(56) References Cited

U.S. PATENT DOCUMENTS 6,814,823 B1 * 11/2004 White ................ B23K 11/0013
156/73.1

* cited by examiner

*Primary Examiner* — Mark A Osele
*Assistant Examiner* — Christopher C Caillouet
(74) *Attorney, Agent, or Firm* — Kinney & Lange, P.A.

(57) ABSTRACT

A method of additive manufacturing of a component includes cutting a plurality of sheets, each sheet corresponding to a respective cross-section of the component, tack welding the sheets to one another to form a stack, arranging the stack in a mold, and spark plasma sintering the tack-welded stack of sheets to reduce vacancies and dislocations between adjacent sheets of the stack.

16 Claims, 4 Drawing Sheets

METHOD FOR PRODUCING VOID-FREE ADDITIVELY MANUFACTURED COMPONENTS

CROSS REFERENCE TO RELATED APPLICATIONS

This application claims the benefit of U.S. Provisional Application No. 61/990,345 filed May 8, 2014 for "Method for Producing Void-Free Additively Manufactured Components" by S. Mironets.

BACKGROUND

Additive manufacturing technologies, such as powder bed fusion, powder and wire deposition processes, laminated object manufacturing (LOM), and ultrasonic consolidation process are well-known processes for generating components in a layer-by-layer process. In LOM processes, thin sheets of material are separately cut and assembled to match the dimensions of a desired finished component. The finished component dimensions are 'sliced' from a CAD model, and the individual layers are cut using a laser cutting operation or water jet cutting process to produce the individual cross sections of the 3D part. The slices are stacked on top of one another, and each slice is attached to the adjacent slice using heat, laser, or electron beam. In some LOM applications, a process known as "tack welding" is used, in which anchor points are welded together prior to connecting the rest of the sheets.

LOM processes can cause internal vacancies and dislocations to be present in the structure that is manufactured, which can result in reduced structural integrity and/or increased surface roughness.

SUMMARY

A method of additive manufacturing of a component includes cutting a plurality of sheets, each sheet corresponding to a respective cross-section of the component, tack welding the sheets to one another to form a stack, arranging the stack in a mold, and spark plasma sintering the tack-welded stack of sheets to reduce vacancies and dislocations between adjacent sheets of the stack.

DETAILED DESCRIPTION

A system combining laminated object slicing, tack welding, and spark plasma sintering is capable of rapidly and efficiently producing additively manufactured parts.

Figure 1:
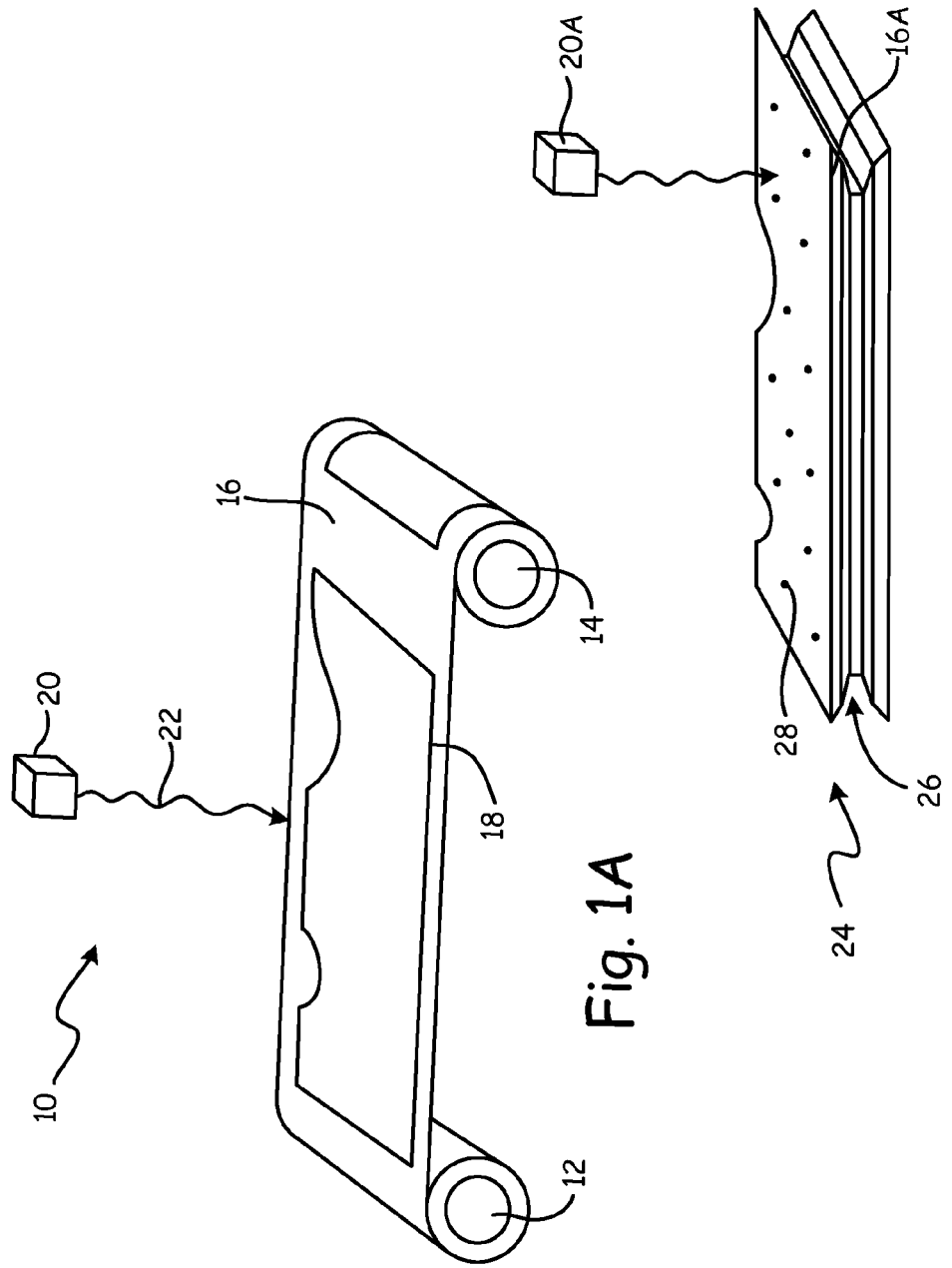
FIGS. 1A-1B illustrate a laminated object manufacturing system.

FIG. 1A is a perspective view of laminated object manufacturing (LOM) cutting system 10. LOM cutting system 10 includes feed roll 12, take-up roll 14, sheet material 16, cutout aperture 18, laser 20, and radiation beam 22.

Feed roll 12 and take-up roll 14 cooperate to move sheet material 16 in front of laser 20. Laser 20 emits radiation beam 22 toward sheet material 16 to form cutout aperture 18. Once cutout aperture 18 is a complete loop, the portion of sheet material 16 located within cutout aperture 18 may be removed. This portion can then be attached to another cutout portion or a stack of other cutout portions and sintered together, as described below with respect to FIG. 1B.

Laser 20 may be positioned such that radiation beam 22 generates an angled cut. For example, if LOM cutting system 10 is used to generate layers of sheet material 16 to be used in a sintered component, it may be beneficial to generate cutout aperture 18 with angled cuts so that a sintered part made of such layers does not require extensive surface finishing.

In alternative embodiments, LOM cutting system 10 may use other technologies to cut sheet material 16. For example, in some embodiments, water jets are used to cut sheet material 16. In other embodiments, laser 20 may be replaced with an electron beam, which is also capable of generating a radiation beam to cut sheet material 16.

FIG. 1B shows tack welding system 24. Tack welding system 24 is used to attach several sheets 16A of sinterable or meltable material together into stack 26. Sheets 16A are cut from sheet material (e.g., sheet material 16 of FIG. 1A). The sheets are arranged layer-by-layer to form stack 26.

As each layer is applied to stack 26, laser 20A sinters or melts the topmost sheet 16A to a sheet directly underneath it at tack points 28. In some cases, multiple sheets may be tacked together simultaneously. This tack welding process prevents undesirable or uncontrolled shifting of any individual sheet 16A relative to an adjacent sheet, which prevents unwanted changes in the shape of stack 26. Tack welding does not completely sinter stack 26; rather, it anchors sheets 16A together at completely melted or sintered tack points 28 only.

Laser 20A may be the same as that used in the cutting process (i.e., laser 20 of FIG. 1A). However tack welding generally requires less power than cutting. Thus, laser 20A may be a different laser, or the same laser used at a lower power level or for a reduced time period.

LOM cutting system 10 of FIG. 1A can be used in conjunction with tack welding system 24 of FIG. 1B to create tack-welded stacks. First, as described in FIG. 1A, sheet material 16 is cut by laser 20 at cutout aperture 18. This process may be repeated by winding sheet material 16 from feed roll 12 to take-up roll 14 and generating a series of cutout apertures 18. The resultant cutout pieces of sheet material 16 form sheets 16A that may then be used by tack welding system 24 of FIG. 1B. Tack welding system 24 melts or sinters sheets 16A to one another at tack points 28 to anchor the sheets 16A to one another and form stack 26. Stack 26 often approximates the shape of a desired finished part. However, stack 26 is often not usable as a finished part because stack 26 is not fully sintered, but rather is only sintered at tack points 28.

Figure 2:
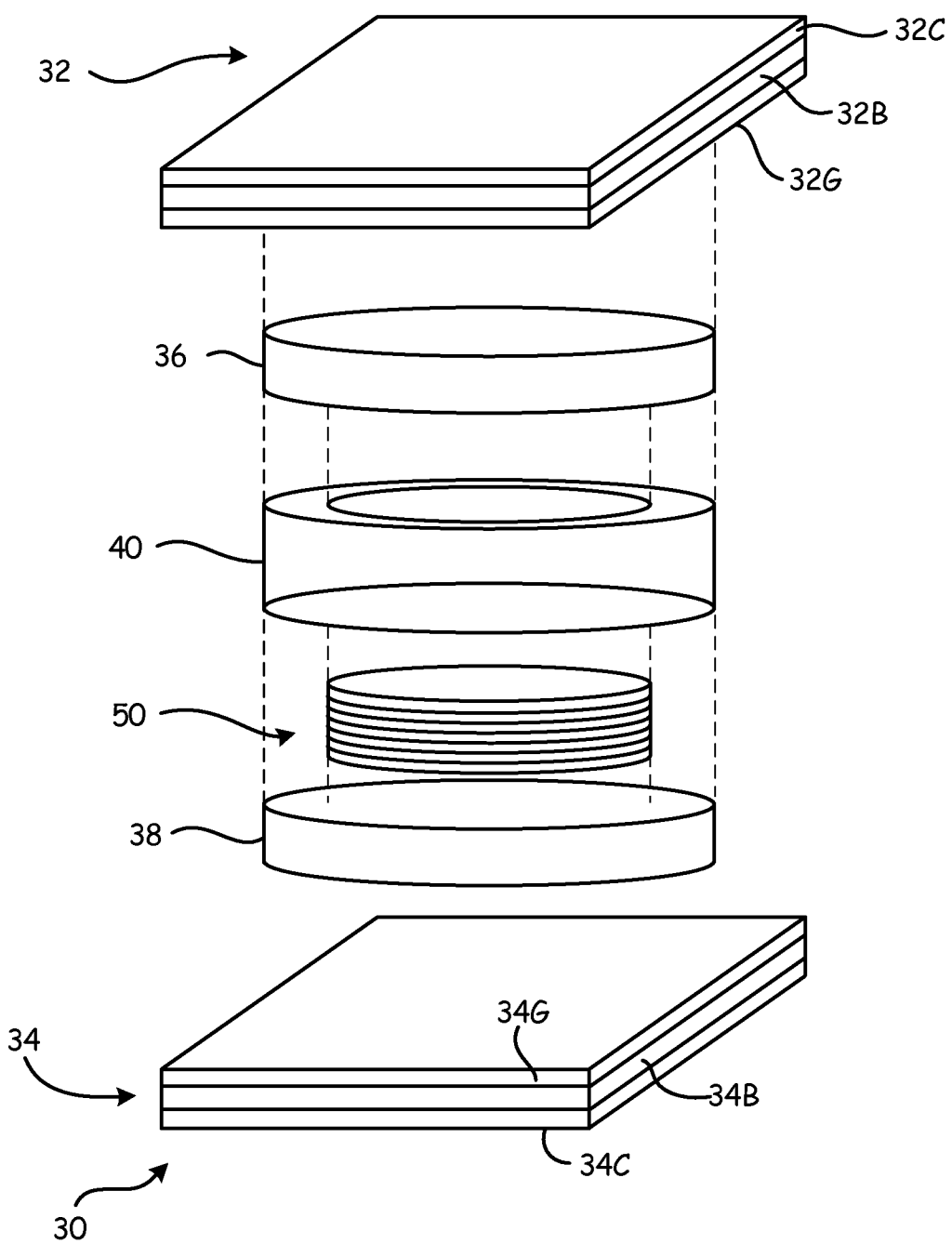
FIG. 2 is an exploded view of a spark plasma sintering system.

Referring now to FIG. 2, spark plasma sintering (SPS) system 30 includes top electrode 32, bottom electrode 34, top platen 36, bottom platen 38, ring mold 40, and stack 50 (e.g., a stack of cutout portions 16A discussed above with respect to FIG. 1A). Top electrode 32 includes copper layer 32C, brass layer 32B, and graphite layer 32G. Similarly, bottom electrode 34 includes copper layer 34C, brass layer 34B, and graphite layer 34G.

Spark plasma sintering (SPS) is similar to traditional hot pressing, except that the current leads to a much faster internal heating rate. A part is compressed and heated, and then direct current is driven through it. The part behaves in a quasi-viscous manner, permitting voids and dislocations to be removed in a pore healing process on account of grain boundary slip. The heat is dissipated throughout the interior of a sintered part within milliseconds, which is beneficial for those materials that have low thermal conductivity and/or "heavy" (i.e., thick) cross-sections. In the quasi-viscous state, grain boundary slip reduces or eliminates vacancies within the material. This sintering process does not require such high temperatures as laser sintering, in which processing temperatures regularly exceed the solidus point of the materials being processed (often 95% or more of the melting point). SPS requires much less time and energy to perform than heat treatment to achieve the same results.

Top electrode 32 and bottom electrode 34 are used to apply electrical current during an SPS process. Direct current is driven between top electrode 32 and bottom electrode 34. Graphite layers 32G and 34G are used because graphite is a durable material that can withstand repeated arcing or other phenomena that could be damaging to another material. Brass layers 32B and 34B are easily machined and highly conductive. Copper layers 32C and 34C are extremely conductive, and can be coupled to a voltage source, such as a transformer (not shown).

Top platen 36 and bottom platen 38 combine to apply pressure on articles located between them. In some embodiments, top platen 36 and bottom platen 38 apply pressures exceeding 100 MPa. Pressure facilitates quasi-viscous behavior in many materials.

Ring mold 40 and stack 50 are positioned between top platen 36 and bottom platen 38. Ring mold 40 is configured to circumscribe stack 50. Stack 50 is a tack welded construction of sheet materials such as those described above with respect to FIG. 1A. When stack 50 is heated by SPS processing and/or compressed by top platen 36 and bottom platen 38, the desired contours of stack 50 are maintained by ring mold 40. In some embodiments, ring mold 40 may also circumscribe top platen 36 and bottom platen 38. Ring mold 40 may be useful to create a vacuum seal around stack 50.

In operation, top electrode 32 and bottom electrode 34 are connected to a high voltage source. Top platen 36 and bottom platen 38 apply pressure on stack 50, while top electrode 32 and bottom electrode 34 supply sufficient direct current to cause SPS in stack 50. SPS often takes only a fraction of a second, during which time current flows through the tack welds (generated by, e.g., laser 20A), then (as any oxide layers in stack 50 are melted) throughout the layers of stack 50. The end result is a fully densified, monolithic part in which vacancies and dislocations have been reduced or removed from the structure. It will be appreciated that such parts have better structural integrity than parts that have not undergone SPS.

Figure 3:
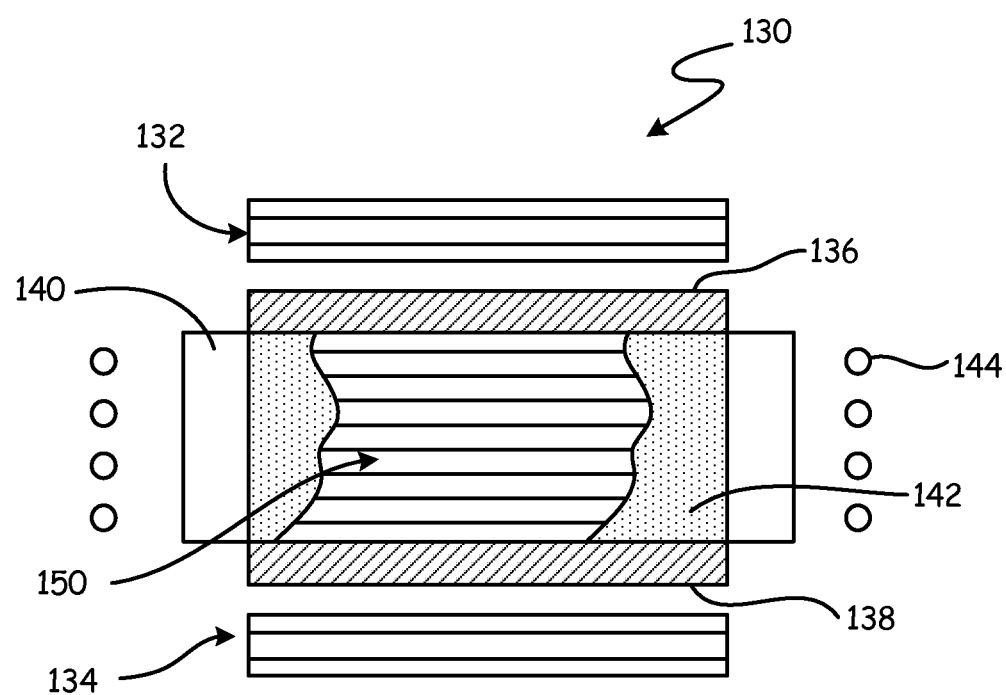
FIG. 3 is a cross-sectional view of a spark plasma sintering system.

FIG. 3 is a cross-sectional view of an alternative SPS system 130. SPS system 130 includes top electrode 132, bottom electrode 134, top platen 136, bottom platen 138, ring mold 140, graphite powder 142, and induction heating coil 144. Stack 150 is positioned within SPS system 130 for SPS processing.

SPS system 130 functions similarly to SPS system 30 of FIG. 2. However, SPS system 130 includes graphite powder 142 for irregularly shaped stack 150. Furthermore, top platen 136 and bottom platen 138 of SPS system 130 move within ring mold 140. Finally, SPS system 130 includes induction heating coil 144, which can be used either to generate heat or to create a magnetic field through stack 150.

Graphite powder 142 is a conductive, pulverant material that is packed within ring mold 140 alongside stack 150. Graphite powder 142 is conductive, and thus during SPS processing provides an electrical path for current that passes through layers of stack 150. Graphite powder 142 may be packed against stack 150. This allows for irregularly shaped stacks 150, because stack 150 need not be shaped substantially similarly to ring mold 140. In fact, by using an oversized ring mold 140 and graphite powder 142, the same ring mold 140 can be used for sequential SPS processing of many parts having different sizes, material compositions, and shapes.

Top platen 136 and bottom platen 138 compress stack 150, are movable towards one another, and are circumscribed by ring mold 140. Top platen 136 and bottom platen 138 also compress graphite powder 142.

Induction heating coil 144 encircles stack 150. For some materials, the application of a magnetic field through stack 150 promotes efficient SPS. In some embodiments, induction heating coil 144 may be used to generate heat to bring stack 150 to a sufficient temperature to ensure complete SPS.

Figure 4:
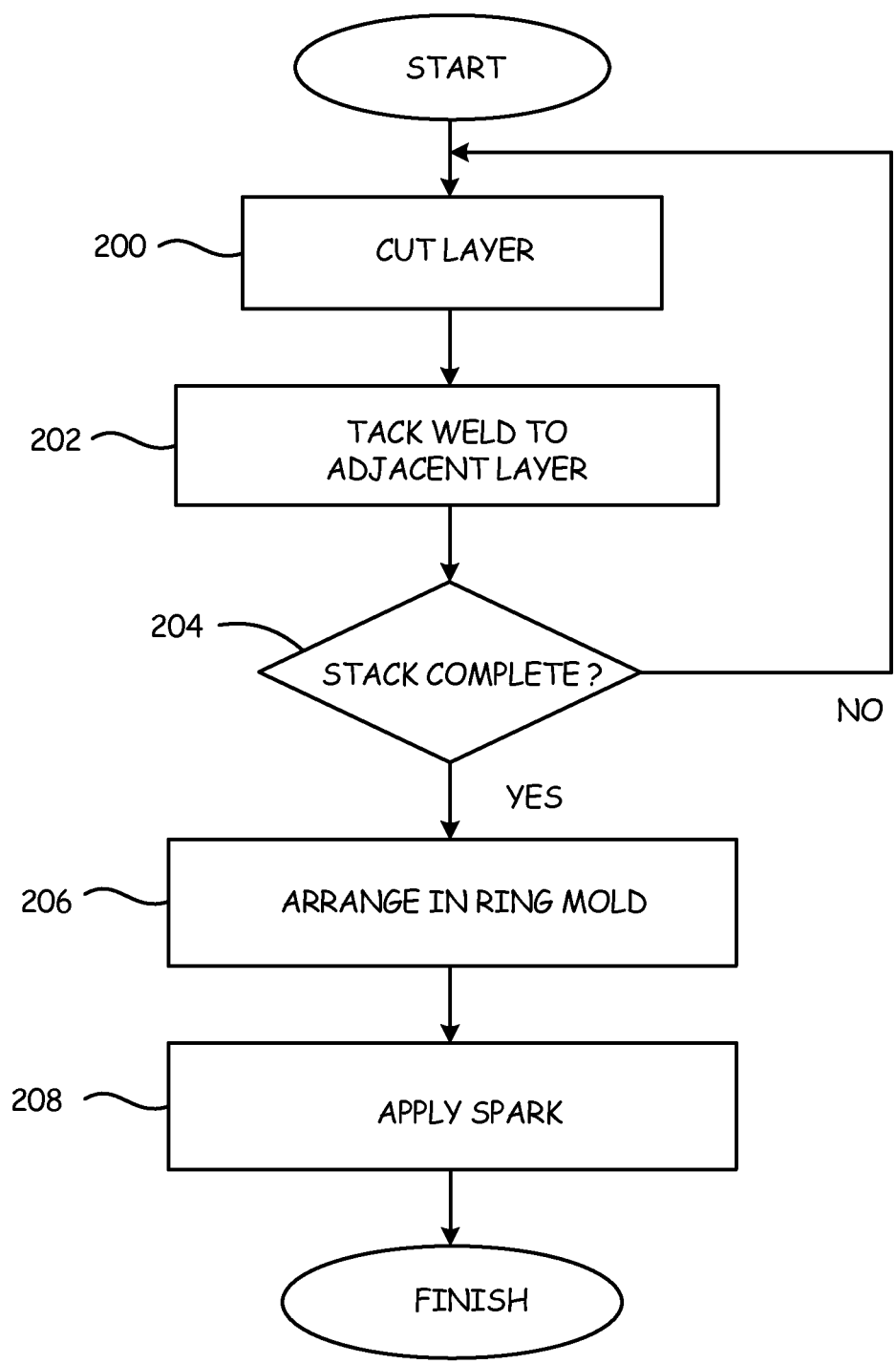
FIG. 4 is a flowchart showing a method of forming an additively manufactured part.

FIG. 4 is a flowchart showing a process for SPS on a part formed by laser slicing and tack welding.

At step 200, a layer is cut. The layer is a cross-section corresponding to a slice of a desired finished part. Often, the cross-section is calculated using a CAD model. The layer may be cut, for example, in the way described with respect to FIG. 1A, with a laser. In alternative embodiments, a layer of a sheet material may be cut using a water jet. In some cases, layers are cut having angled edges.

At step 202, the layer is tack welded to an adjacent layer. In the case of the first cut, the layer from step 46 is often tack welded to a stable substrate. As additional layers are cut, each layer is positioned on a previously cut layer and tack welded. Tack welding is accomplished by selecting tack points, as previously described with respect to FIG. 1B, and anchoring the layer to an adjacent layer by melting or sintering the two layers together at those tack points.

At step 204, if the stack is not yet complete (i.e., the stack of layers that have been tack welded together does not yet correspond to the desired finished part) then additional layers are cut and tack welded by repeating steps 200 and 202. This process may be repeated several thousand times. If, however, the stack is complete, the stack may be moved to an SPS system.

At step 206, SPS is started. The stack is arranged in a ring mold. Often, the ring mold is arranged within a vacuum to promote the removal of voids or other imperfections in the stack, which could otherwise be filled with the ambient atmosphere. The ring mold is also often positioned between platens that compress the stack. The compression provided by these platens promotes sintering during SPS. In some cases, graphite powder is used to fill any space between the ring mold and the stack.

At step 208, a spark is applied. The spark causes a DC current to run through the stack. Such current causes heating and sintering of the conductive stack. As a result of the temperature, pressure, and current, the layers that make up the stack exhibit quasi-viscous behavior, and voids are eliminated as the stack sinters into a monolithic component.

In the case of a metal component, each layer of the stack typically has an oxidized surface. This oxidized surface can prevent good lamination and adhesion between adjacent layers, or impede electrical current from passing between the layers. The oxide can be removed with heat grain dislocation, for example via tack welding and/or SPS. SPS drives sufficient current through the stack to break down an oxidized portion of the layer surface and allow current to flow more freely through the stack, reducing the overall resistance of the stack and causing higher current levels and power dissipation. Compression of the stack via the pressure applied between platens can also contribute to the breakdown of a portion of the oxide layers. In some embodiments, the pressure can be as high as 100 mega-Pascals (MPa). Once the first oxide layers have been broken, either by the DC current provided via SPS, plastic deformation, or tack welding, for example, the resistance of the stack drops dramatically and the current through the stack increases. This leads to heating, and elimination of residual porosity. The application of current through the stack causes this heating to occur at a high heating rate, which allows components to be additively manufactured with short sintering cycle times, such as about 10 minutes in some embodiments, compared to sintering cycles of several hours that are required in other methods. Lower sintering temperatures are also possible due to the high level of local heating in the stack, which is desirable in many applications.

Discussion of Possible Embodiments

The following are non-exclusive descriptions of possible embodiments of the present invention.

A method of additive manufacturing of a component includes cutting a plurality of sheets, each sheet corresponding to a respective cross-section of the component, tack welding the sheets to one another to form a stack, arranging the stack in a mold, and spark plasma sintering the tack-welded stack of sheets to reduce vacancies and dislocations between adjacent sheets of the stack.

The method of the preceding paragraph can optionally include, additionally and/or alternatively, any one or more of the following features, steps, configurations and/or additional components:

Arranging the stack in the mold may include positioning the stack in a ring mold.

Arranging the stack in the mold may include applying pressure to compress the sheets of the stack together.

Applying pressure to compress the sheets of the stack together may include arranging a first platen to apply pressure to the one side of the stack, and arranging a second platen to apply pressure to the opposite side of the stack.

Spark plasma sintering may include arranging a first electrode in electrical communication with the one side of the stack, arranging a second electrode in electrical communication with the opposite side of the stack, and applying a sufficient electrical potential between the first electrode and the second electrode to heat the stack.

The first electrode may include a copper layer, a brass layer arranged between the copper layer and the stack, and a graphite layer arranged between the brass layer and the stack.

The method may further include heating the stack prior to spark plasma sintering.

The method may further include applying a magnetic field in the stack during spark plasma sintering.

Applying a magnetic field in the stack may include driving current in an induction heating coil arranged around the mold.

The mold may be configured to circumscribe the stack.

The method may further include packing a powder material between the mold and the stack.

The powder material may be a conductive powder.

The powder material may be a graphite powder.

Cutting the plurality of sheets may include cutting a sheet material using a radiation source.

The radiation source may be a laser.

Spark plasma sintering may include inducing a quasi-viscous state in the stack.

According to a further embodiment, a spark plasma sintering system includes a mold configured to surround a stack of tack-welded sheets, a top platen and a bottom platen configured to cooperate to apply a pressure to the stack of tack-welded sheets, and a first electrode and a second electrode configured to cooperate to apply a direct current across the stack of tack-welded sheets.

The spark plasma sintering system of the preceding paragraph can optionally include, additionally and/or alternatively, any one or more of the following features, configurations and/or additional components:

The spark plasma sintering system may further include a graphite powder arranged between the mold and the stack of tack-welded sheets.

The first electrode and the second electrode may each include a copper layer, a brass layer arranged between the copper layer and the stack of tack-welded sheets, and a graphite layer arranged between the brass layer and the stack of tack-welded sheets.

The spark plasma sintering system may further include an induction heating coil configured to generate a magnetic field in the stack of tack-welded sheets.

Although the present invention has been described with reference to preferred embodiments, workers skilled in the art will recognize that changes may be made in form and detail without departing from the spirit and scope of the invention.

The invention claimed is:

1. A method for additive manufacturing a component, the method comprising:
    (a) cutting a plurality of sheets, each sheet corresponding to a respective cross-section of the component;
    (b) tack welding the sheets to one another to form a stack;
    (c) arranging the stack in a mold; and
    (d) spark plasma sintering the tack-welded stack of sheets to reduce vacancies and dislocations between adjacent sheets of the stack.

2. The method of claim 1, wherein arranging the stack in the mold comprises positioning the stack in a ring mold.

3. The method of claim 1, wherein arranging the stack in the mold comprises applying pressure to compress the sheets of the stack together.

4. The method of claim 3, wherein applying pressure to compress the sheets of the stack together comprises:
    arranging a first platen to apply pressure to one side of the stack and;
    arranging a second platen to apply pressure to an opposite side of the stack.

5. The method of claim 4, wherein spark plasma sintering comprises:
    arranging a first electrode in electrical communication with the one side of the stack;
    arranging a second electrode in electrical communication with the opposite side of the stack; and
    applying a sufficient electrical potential between the first electrode and the second electrode to heat the stack.

6. The method of claim 5, wherein the first electrode comprises:
    a copper layer;
    a brass layer arranged between the copper layer and the stack; and
    a graphite layer arranged between the brass layer and the stack.

7. The method of claim 1, further comprising heating the stack prior to spark plasma sintering.

8. The method of claim 1, further comprising applying a magnetic field in the stack during spark plasma sintering.

9. The method of claim 8, wherein applying a magnetic field in the stack comprises driving current in an induction heating coil arranged around the mold.

10. The method of claim 1, wherein the mold is configured to circumscribe the stack.

11. The method of claim 1, further comprising packing a powder material between the mold and the stack.

12. The method of claim 11, wherein the powder material is a conductive powder.

13. The method of claim 12, wherein the powder material is a graphite powder.

14. The method of claim 1, wherein cutting the plurality of sheets comprises cutting a sheet material using a radiation source.

15. The method of claim 14, wherein the radiation source is a laser.

16. The method of claim 1, wherein spark plasma sintering includes inducing a quasi-viscous state in the stack.

\* \* \* \* \*